United States Patent [19]

Kress

[11] Patent Number: 4,747,227
[45] Date of Patent: May 31, 1988

[54] FISHING ROD AND METHOD OF ASSEMBLING SUCH

[75] Inventor: James H. Kress, Satellite Beach, Fla.

[73] Assignee: Tournament Tackle, Inc., Satellite Beach, Fla.

[21] Appl. No.: 879,600

[22] Filed: Jun. 27, 1986

[51] Int. Cl.$^4$ ............................................. A01K 87/02
[52] U.S. Cl. ........................................ 43/18.1; 43/23; 43/25
[58] Field of Search .................... 43/23, 18.1, 21.2, 25

[56] References Cited

U.S. PATENT DOCUMENTS

| | | | |
|---|---|---|---|
| 450,906 | 4/1891 | Blakely | 43/23 |
| 2,180,323 | 11/1939 | Maxwell | 43/23 |
| 2,729,012 | 1/1956 | Lee | 43/18.1 |
| 3,614,143 | 10/1971 | Stevens | 43/18.1 X |
| 3,811,215 | 5/1974 | Fleischer | 43/18.1 |
| 3,876,320 | 4/1975 | Phillipson | 43/23 X |
| 4,577,432 | 3/1986 | Brackett et al. | 43/18.1 X |

FOREIGN PATENT DOCUMENTS 930272 7/1963 United Kingdom .

Primary Examiner—Nicholas P. Godici
Assistant Examiner—Carmine Cuda
Attorney, Agent, or Firm—James H. Beusse

[57] ABSTRACT

A method of assembling a fishing rod including a rod member, a conic enlargement on the rod member, and a foregrip having a generally conic inner circumferential surface and an outer circumferential surface with a part thereof being eccentric with respect to the conic inner circumferential surface. In practicing this method, the conic inner circumferential surface of the foregrip is wedged into engagement with the conic enlargement on the rod member, and the eccentric part of the outer circumferential surface of the foregrip is arranged in a preselected angular position therefor extending generally circumferentially outwardly from the rod member.

Other methods of assembling a fishing rod and other fishing rods are also disclosed.

17 Claims, 2 Drawing Sheets

FISHING ROD AND METHOD OF ASSEMBLING SUCH

FIELD OF THE INVENTION

This invention relates in general to apparatus utilized in fishing and in particular to an improved fishing rod and an improved method of assembling a fishing rod.

BACKGROUND OF THE INVENTION

In the past, fishermen have been known to suffer from muscle cramps and soreness of hands and forearms while fighting larger game fish because of the need to apply excessive hand gripping force on the fishing rod in order to oppose a torque moment imparted to the fishing rod from a reel attached thereto upon the operation of the reel.

Rotation of a reel by the fisherman when reeling against a strong line pull of a larger game fish established a torque moment generally circumferentially about the rod since the operating handle of the reel was generally circumferentially offset from the fishing rod. This torque moment causes the reel to wobble from side to side when the line is reeled thereby reducing the amount of force that can be exerted on the line while reeling which, of course, reduces the fisherman's effectiveness in fighting the fish. This torque moment acting about the past fishing rods has a tendency to effect the rotation or wobble thereof from side to side, and at least one of the disadvantageous or undesirable features of such a past fishing rod was that it was necessary for the fisherman to apply excessive gripping force and to regrip the fishing rod in order to apply force thereon to counteract the torque moment acting on the fishing rod. This torque moment correcting action of the fisherman resulted in the aforementioned muscle cramps and hand and forearm soreness which is also a disadvantageous or undesirable feature.

SUMMARY OF THE INVENTION

Among the several objects of the present invention may be noted the provision of an improved fishing rod and an improved method of assembling a fishing rod which overcomes the disadvantageous and undesirable features discussed above, as well as others, with respect to the prior art; the provisions of such improved fishing rod and method having a foregrip with an eccentric part associated in offset relation with respect to such fishing rod thereby to establish a lever arm between such fishing rod and the contact of the fisherman's hand with the eccentric part of the foregrip which permits the fisherman to stabilize a torque moment imparted to the fishing rod from a reel secured thereto during reeling; the provision of such improved fishing rod and method in which the foregrip is adjustably movable circumferentially about the fishing rod to locate the eccentric part of the foregrip in a radially extending position selected by the fisherman; the provision of such improved fishing rod and method in which the foregrip is disposed in wedging engagement with an enlargement provided therefor on the fishing rod thereby to maintain the eccentric part of the foregrip against displacement from the position therefor selected by the fisherman; the provision of such improved fishing rod and method in which the foregrip is releasably retained against displacement from the wedging engagement thereof with the enlargement on the rod; the provision of such improved method which is applicable to existing fishing rods; and the provision of such improved fishing rod and methods in which the component parts utilized therein are simple in design, economically manufactured and easily assembled. These as well as other objects and advantageous features of the present invention will be in part apparent and in part pointed out hereinafter.

In general, a method is provided in one form of the invention for assembling a fishing rod. The fishing rod includes a generally elongated rod member, a generally conic enlargement on the rod member, and a foregrip having a generally conic inner circumferential surface extending at least in part therethrough and an outer circumferential surface with at least a part thereof being eccentric with respect to the conic inner circumferential surface. In practicing this method, at least a part of the conic inner circumferential surface of the foregoing is wedged into engagement with at least a part of the conic enlargement on the rod member, and the eccentric at least part of the outer circumferential surface of the foregrip is arranged in a preselected angular position therefor generally circumferentially about the rod member so as to extend generally radially therefrom Further in general, a fishing rod in one form of the invention is provided with a generally elongated rod member. A foregrip is releasable retained in an assembled position in wedging engagement with a part on the rod member against movement relative to the rod member, and the foregrip includes an outer circumferential surface with at least a part thereof being eccentric with the rod member and disposed in a preselected angular position generally circumferntially about the rod member part so as to extend generally radially therefrom when the foregrip is in its assembled position.

BRIEF DESCRIPTION OF THE DRAWINGS

Corresponding reference characters indicate corresponding parts throughout the several views of the drawings.

The exemplifications set out herein illustrate the preferred embodiments of the present invention in one form thereof, and such exemplifications are not to be construed as limiting either the scope of the invention or the scope of the disclosure thereof in any manner.

DETAILED DESCRIPTION OF THE PREFERRED EMBODIMENTS

Figure 1:
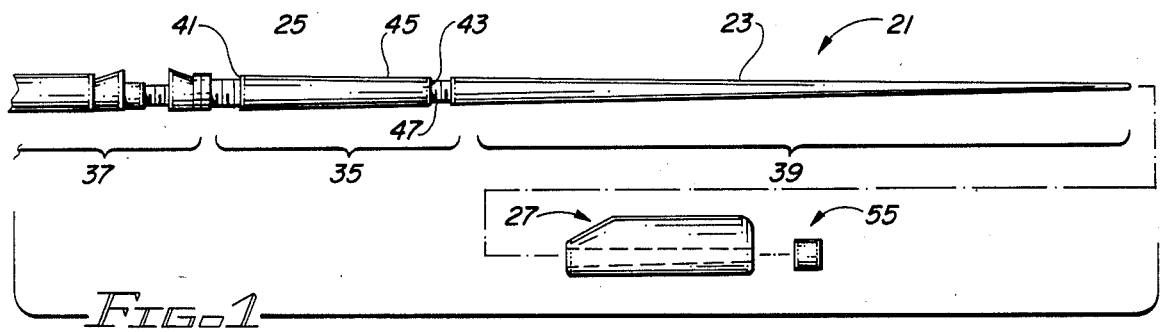
FIG. 1 is an exploded side elevational view showing a fishing rod in one form of this invention and illustrating principles which may be practiced in a method of assembling a fishing rod also in one form of the invention.
Figure 2:
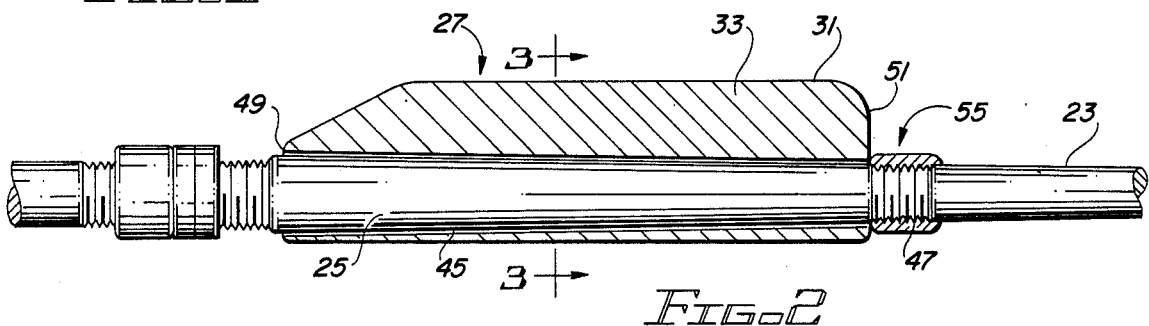
FIG. 2 is an enlarged sectional view of the fishing rod FIG. 1 showing a foregrip thereof releasably retained in wedging engagement with a conic enlargement on the fishing rod.
Figure 3:
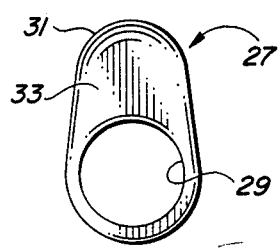
FIG. 3 is a sectional view taken along line 3—3 in FIG. 2.

With reference to the drawings in general, there is illustrated in one form of the invention a method of assembling a fishing rod 21 (FIGS. 1-3). Fishing rod 21 includes a generally elongated rod member 23, a generally frusto-conically shaped or conic enlargement 25 on the rod member, and a foregrip or foregrip means 27 having a generally conic inner circumferential surface 29 extending at least in the part therethrough and an outer circumferential surface 31 with at least a part 33 thereof being eccentric with respect to the conic inner circumferential surface 29 (FIGS. 1 and 2). In the practice of this method, at least a part of conic inner circumferential surface 29 of foregrip 27 is wedged into engagement with at least a part of conic enlargement 25, and eccentric part 33 of outer circumferential surface 31 of the foregrip is arranged or otherwise disposed in a preselected angular position therefor generally circumferentially about the rod member so as to extend generally radially outwardly therefrom (FIGS. 2 and 3).

More particularly and with specific reference to FIGS. 1-3, rod member 23 may be formed of any suitable matrial having the necessary strength and resiliency characteristics, such as for instance a resin material or the like which may be reinforced with a fiber, if desired, and although the rod member 23 is illustrated as having a generally circular cross-section, it is contemplated that the rod member 23 may have various different cross-sectional configurations within the scope of the invention so as to meet at least some of the objects thereof. Rod member 23 is provided with an intermediate section 35 interposed between a pair of generally opposite end sections, such as a grip end section 37 and a tip end section 39 for instance, and enlargement 25 is integrally formed with the intermediate section 35 of the rod member 23 so as to extend generally radially outwardly therefrom. Although discussed as separate sections, it is to be understood that the intermediate section 35, the grip end section 37, and the tip end section 39 may be integrally formed. While enlargement 25 is illustrated as being integrally formed on rod member 23, the enlargement may be separate from the rod member, as discussed in greater detail hereinafter. A pair of opposite ends or end portions 41, 43 of enlargement 25 define the axial length thereof along intermediate section 35 of rod member 23, and a generally conic outer circumferential surface 45 about the enlargement is interposed between the opposite ends thereof. Opposite end 41 of enlargement 25 extends generally radially between intermediate section 35 of rod member 23 and conic outer circumferential surface 45 in the enlargement, and opposite end 41 faces generally toward grip end section 37 of the rod member. Although the intersections of conic outer circumferential surface 45 on enlargement 25 with intermediate section 35 of rod member 23 is shown herein as defining opposite end 43 of the enlargement for purposes of disclosure, it is contemplated that opposite end 43 may extend generally radially between the intermediate section and the conic outer circumferential surface and face generally toward tip end section 39 of the rod member within the scope of the invention so as to meet at least some of the objects thereof. To complete this discussion of rod member 23, a threaded portion 47 is integrally provided about intermediate section 35 of the rod member at least generally adjacent opposite end 43 of enlargement 25.

Foregrip 27 may be formed of any suitable material having the desired strength characteristics, such as for instance a resin material or the like, and albeit not shown for the purpose of drawing simplification, the foregrip may be covered in part with a soft or padded fabric to enhance the gripping thereof by a fisherman. Conic inner circumferential surface 29 and outer circumferential surface 31 of foregrip 27 are interposed between a pair of generally opposite ends or end portions 49, 51 thereof, and if desired, a storage chamber may be provided within the foregrip 27 for fishing tackle or the like. While foregrip 27 is illustrated herein as being generally oblong in cross-section, it is contemplated that the foregrip may be provided with various other different configurations within the scope of the invention so as to meet at least some of the objects thereof.

To initiate the assembly of fishing rod 21 prior to installation of line guides, conic inner circumferential surface 29 of foregrip 27 is placed in a position separated from rod member 23 and generally in alignment with tip end section 39 of the rod member with opposite end 49 of the foregrip facing generally toward the tip end section. Upon this alignment of foregrip 27 with tip end section 39 of rod member 23, the foregrip is intially moved in an assembly direction toward the rod member so as to dispose conic inner circumferential surface 29 of the foregrip generally about the tip end section, and in response to further movement in the assembly direction, the foregrip is passed along the rod member generally lengthwise thereof toward enlargement 25 on intermediate section 35 of the rod member. During this movement of foregrip 27 in the assembly direction, eccentric part 33 of the foregrip may be angularly located in a preselected angular position with respect to rod member 23 so as to extend generally radially therefrom. Of course, the movement of foregrip 27 in the assembly direction is terminated when conic inner circumferential surface 29 of the foregrip 27 becomes associated or otherwise mated in the forementioned wedging engagement thereof with conic outer circumferential surface 45 of enlargement 25 on rod member 23 thereby to define an assembly position or a preselected assembly position of the foregrip 27 on fishing rod 21. When foregrip 27 is so disposed in its assembly position, a force may be exerted on the foregrip 27, if desired, to insure or intensify the wedging engagement between conic inner circumferential surface 29 of the foregoing and conic outer circumferential surface of enlargement 25. It may be noted that when foregrip 27 is in its assembled position, the wedging engagement between conic inner circumferential surface 29 of the foregrip and conic outer circumferential surface 45 of enlargement 25 on rod member 23 obviates generally circumferential displacement of the foregrip about the enlargement and the rod member. When foregrip 27 is in its assembled position, it may also be noted that eccentric part 33 of the foregrip is angularly arranged or otherwise located in a preselected angular position therefor generally circumferentially about rod member 23 so as to extend generally radially outwardly therefrom. In this preselected angular position, eccentric part 33 of foregrip 27 is conveniently located to be gripped by the fisherman, and the radial extension of the eccentric part of this foregrip from rod member 23 defines a lever arm on which force may be exerted by the fisherman to counteract the aforementioned wobbling or torque moment which may be exerted on rod member from a reel (not shown) upon the reeling operation thereof. It it is desirable to adjust the preselected angular position of eccentric part 33 on foregrip 27, the foregrip may be adjustably moved or displaced from its assembly position generally axially or lengthwise of rod member 23 toward a position displaced from enlargement 25 thereon so as to interrupt the wedging engagement between conic inner circumferential surface 29 of the foregrip and conic outer circumferential surface 45 of the enlargement. When foregrip 27 is in the displaced position thereof, eccentric part 33 of the foregrip may be rotated generally circumferentially about rod member 23 into the desired preselected angular position, and upon such adjustable repositioning or relocating of the eccentric part of the foregrip, the foregrip may be returned into its assembly position, as discussed above.

Upon the disposition of foregrip 27 into its assembled position establishing the wedging engagement thereof with enlargement 25 on rod member 23, a generally cup-shaped or annular threaded retainer or sleeve 55 movably disposed about the rod is threadedly engaged with threaded portion 47 on intermediate section 35 of the rod member and also is abutted or engaged against opposite end 51 of the foregrip thereby to releaseably retain or urge the foregrip against the displacement of its conic inner circumferential surface 29 from the wedging engagement thereof with conic outer circumferential surface 45 of the enlargement. To complete the description of the method of assembling fishing rod 21, it may be noted that threaded retainer 55 comprises a means associated with foregrip 27 and a part of rod member 23, such as threaded portion 47 thereof for instance, for releasedly retaining the foregrip 27 against movement from the assembled position toward the displaced position thereof.

Figure 4:
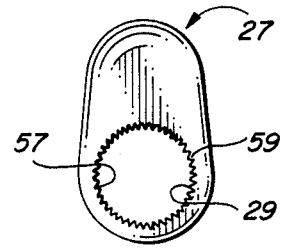
FIG. 4 is generally the same as FIG. 3, but showing an alternative construction in one form of the invention of mating grooves in the foregrip and the enlargement on the fishing rod.

In an alternative construction in one form of the invention, as best seen in FIG. 4, a pair of sets of generally longitudinal and mating grooves or serrations 57, 59 or the like for instance may be provided in conic inner circumferential surface 29 of foregrip 27 and conic outer circumferential surface 45 of enlargement 25 extending generally lengthwise between opposite ends 41, 43 of the enlargement and between opposite ends 49, 51 of the foregrip, respectively. Of course, when foregrip 27 is moved into its assembled position with enlargement 25, as discussed above, grooves or groove means 57, 59 are interlocked in mating engagement with each other, and in this manner, the interlocking of the grooves serves to at least in part assist the wedging engagement between conic inner circumferential surface 29 of the foregrip 27 and conic outer circumferential surface 45 of the enlargement in retaining the foregrip against circumferential displacement or movement about the enlargement and rod member 23. Thus, grooves 57, 59 comprise a pair of sets of means for engagement with each other thereby to at least in part assist the wedging engagement between conic inner circumferential surface 29 of foregrip 27 and conic outer circumferential surface 45 of enlargement 25 in retaining the foregrip against circumferential movement about the enlargement when the foregrip is in its assembled position. While mating grooves 57, 59 are illustrated herein for purposes of disclosure, it is contemplated that other means of different configurations, such as for instance sets of mating flats or the like, may be provided in conic inner circumferential surface 29 of foregrip 27 and conic outer circumferential surface 45 of enlargement 25 for resisting circumferntial displacement of the foregrip about the enlargement within the scope of the invention so as to meet at least some of the objects thereof.

Figure 5:
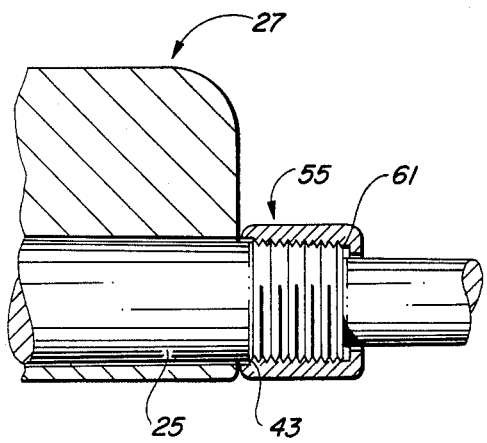
FIG. 5 is a partial view taken from FIG. 2 but showing an alternative construction in one form of the invention for releasedly retaining the foregrip.

In another alternative construction in one form of the invention, as best seen in FIG. 5, a generally annular threaded sleeve 61 is provided in the place of the above discussed threaded portions 47 of rod member 23, and the threaded sleeve 61 is disposed about intermediate section 35 of the rod member adjacent opposite end 43 of enlargement 25 on the rod member for threaded engagement with threaded retainer 55 thereby to retain foregrip 27 against displacement from the assembled position toward the displaced position thereof. While threaded sleeve 61 is illustrated herein as being integrally formed in place about intermediate section 35 of rod member 23, it is contemplated that the threaded sleeve may be assembled about the intermediate section and secured thereto in place by suitable means well known to the art within the scope of the invention so as to meet at least some of the objects thereof.

Figure 6:
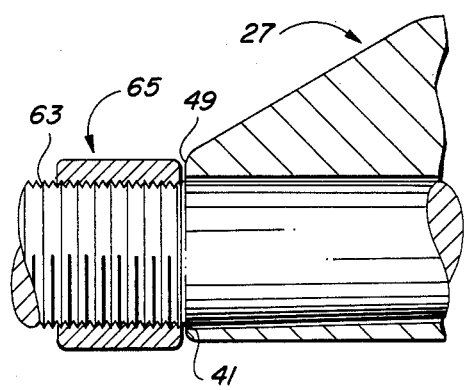
FIG. 6 is a partial view taken from FIG. 2 but showing another alternative construction in one form of the invention for disengaging the foregrip from its wedging engagement.

In still another alternative construction in one form of the invention, as best seen in FIG. 6, fishing rod 21 may be provided with another threaded portion 63 integrally formed about intermediate section 35 of rod member 23 at least generally adjacent opposite end 41 of enlargement 25. A driving means, such as for instance a generally cup-shaped or annular threaded drive member or sleeve 65, is threadedly engaged with threaded portion 63 on rod member 23 intermediate section 35 so as to be selectively manually operable generally for driving foregrip 27 from the assembly position toward the displaced position thereof. Thus, it may be noted that in the event the gripping intensity of the wedging engagement between foregrip 27 and enlargement 25 is great enough to obviate ready or easy manual movement of the foregrip from the assembly position toward the displaced position thereof, driving member 65 may be threadedly operable or movable on threaded position 63 of rod member intermediate section into driving engagement with opposite end 49 of foregrip 27 thereby to urge or drive the foregrip from the assembly position toward the displaced position thereof and interrupt the wedging engagement between the foregrip and the enlargement. Of course, prior to the above-discussed operation of threaded drive member 65, it is necessary to disengage threaded retainer 55 from opposite end 51 of foregrip 27.

With reference again in general to the drawings and recapitulating at least in part with respect to the foregoing, fishing rod 21 in one form of the invention is provided with rod member 23 and foregrip 27 (FIGS. 1-3). Foregrip 27 is releasably retained in an assembled position in wedging engagement with a part, such as enlargement 25 or the like for instance, on rod member 23 against displacement relative to the rod member (FIG. 2). Foregrip 27 includes outer circumferential surface 31 with at least a part thereof, such as eccentric part 33 or the like for instance, being eccentric with respect to rod member 23 and adjustably disposed in a preselected angular position generally circumferentially about the rod member so as to extend generally radially therefrom when the foregrip is in its assembled position (FIG. 3).

Figure 7:
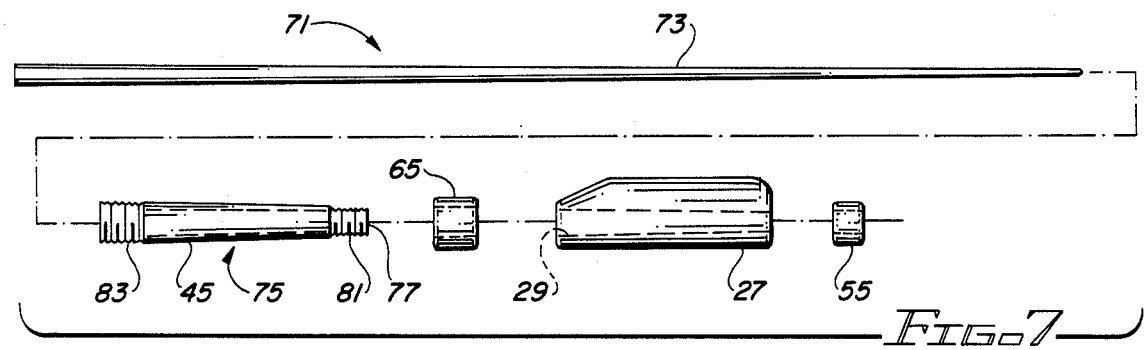
FIG. 7 is an exploded side elevational view showing an alternative fishing rod in one form of the invention and illustrating principles which may be practiced in an alternative method of assembling a fishing rod also in one form of the invention.
Figure 8:
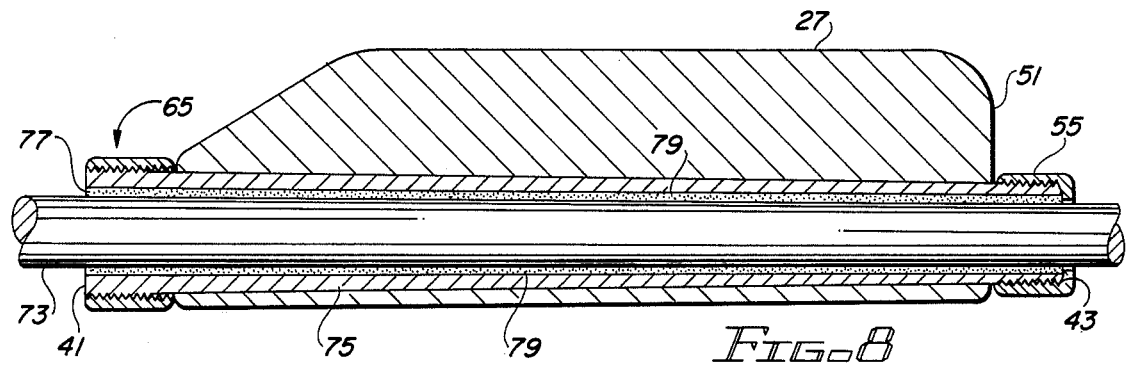
FIG. 8 is an enlarged partial sectional view of the fishing rod of FIG. 7 with the component parts thereof in assembled relation.

An alternative method on one form of the invention is illustrated for assembling an alternative fishing rod 71 shown also in one form of the invention (FIGS. 7 and 8). Fishing rod 71 includes a generally elongated rod member 73, an enlargement body 75 having a bore 77 extending generally axially therethrough and conic outer circumferential surface 45, and foregrip 27 having generally conic inner circumferential surface 29 (FIG. 7). In practicing this alternative method, enlargement body 75 is secured in a preselected position therefor to rod member 73, and bore 77 of the enlargement body 75 is arranged or otherwise disposed about the rod member at least upon the securement thereto of the enlargement body (FIG. 8). Conic inner circumferential surface 29 of foregrip 27 is associated about rod member 73, and the conic inner circumferential surface is moved into wedging engagement with at least a part of the conic outer circumferential surface 45 of enlargement body 75 in the preselected position thereon on the rod member (FIGS. 7 and 8).

Alternative fishing rod 71 and the alternative method of assembling such utilize generally the same component parts assembled together and functioning generally in the same manner as those of the previously discussed fishing rod 21 and method of assembling such with the exceptions noted in the following discussion, and while the alternative fishing rod and method of assembling such meet at least some of the objects set out hereinbefore, it is believed that the alternative fishing rod and method of assembling such have indigenous objects and advantageous features as will be in part apparent and in part pointed out in the following discussion.

More particularly and with specific reference to FIGS. 7 and 8, rod member 73 is the same as the previously discussed rod member 23 with enlargement 25 removed therefrom, and enlargement body 75 is generally the same as the previously discussed enlargement 25. However, bore 77 of enlargement body 75 is interposed between opposite ends 41, 43 thereof, and opposite end 43 faces toward tip end section 39 of rod member 73.

To initiate the assembling of fishing rod 71, enlargement body 75 is placed in a position separated from rod member 73 with bore 77 of the enlargement body generally in alignment with tip end section 39 of the rod member so that opposite end 41 of the enlargement body faces generally toward the tip end section of the rod member. Subsequent to this alignment of bore 77 in enlargement body 75 with tip end section 39 of rod member 73, the enlargement body is intially moved in an assembly direction toward the rod member so as to disposed the bore in the enlargement body generally about the tip end section of the rod member, and in response to further movement in the assembly direction, the enlargement body is passed along the rod member generally lengthwise thereof toward intermediate section 35 on which the preselected position of the enlargement body is defined. Prior to the above discussed association of enlargement body 75 with rod member 73, a hardenable adhesive material 79 is applied to or coated on at least one of enlargement body bore 77 and rod member intermediate section 35 at least generally adjacent the preselected position of the enlargement body thereon. Therefore when enlargement body 75 is located in the preselected position therefor on intermediate section 35 of rod member 73, hardenable adhesive material 79 is hardened in place between the enlargement body bore and the rod member intermediate section thereby to effect the securement of the enlargement body in its preselected position. With enlargement body 75 so secured in the preselected position thereof on rod member 73, foregrip 27 may be moved toward its assembly position in the same manner as discussed hereinabove thereby to wedge conic inner circumferential surface 29 of the foregrip into the engagement thereof with conic outer circumferential surface 45 of the enlargement body in the preselected position thereof on the rod member. Thus, eccentric part 33 of foregrip 27 may be located or adjustably relocated in the preselected angular position thereof with respect to rod member 73 in the same manner as discussed hereinbefore. It may be noted that another threaded portion 81 is integrally provided about enlargement body 75 between conic outer circumferential surface 45 and opposite end 43 of the enlargement body, and when foregrip 27 is in its assembly position, threaded portion 81 extends beyond opposite end 51 of the foregrip. Thus, in order to effect the releasable retainment of foregrip 27 in its assembled position, threaded retainer 55 is threadedly engaged with threaded portion 81 on enlargement body 75 and abutted or engaged against opposite end 51 of the foregrip. Albeit not shown for purposes of drawing simplification and brevity of disclosure, it is contemplated that grooves 57, 59 may be utilized with foregrip 27 and enlargement body 75 in the same manner as discussed hereinbefore within the scope of the invention so as to meet at least some of the objects thereof.

Another threaded portion 83 is integrally provided about enlargement body 75 at least generally adjacent opposite end 41 thereof, and drive member 65 is threadedly received therein for driving engagement with opposite end 49 of foregrip 27 in the same manner as discussed in detail hereinabove. To complete the description of the method of assembling fishing rod 71, it should be noted that such method is applicable to at least some existing fishing rods and may be practiced to impart to such existing fishing rods the advantageous features discussed herein with respect to such method.

Figure 9:
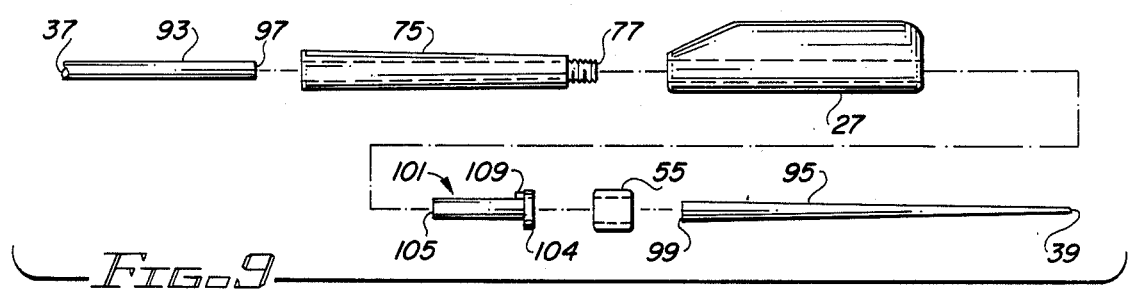
FIG. 9 is an exploded side elevational view showing another alternative fishing rod in one form of the invention and illustrating principles which may be practiced in another alternative method of assembling a fishing rod also in one form of the invention.
Figure 10:
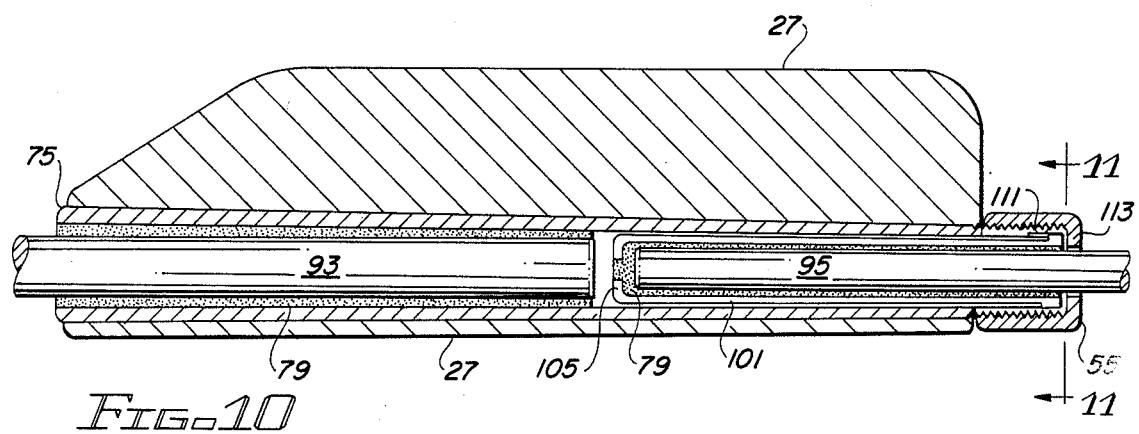
FIG. 10 is an enlarged sectional view showing the fishing rod of FIG. 9 with the component parts thereof in assembled relation.
Figure 11:
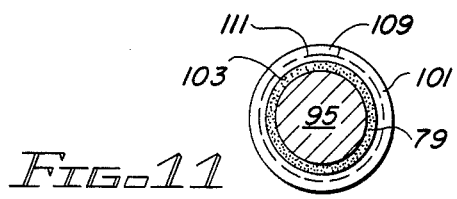
FIG. 11 is an enlarged partial view taken from FIG. 10.

With further reference to the drawings in general and recapitulating at least in part with respect to the foregoing, another alternative method in one form of the invention is illustrated for assembling an alternative two-piece fishing rod 91 shown also in one form of the invention (FIGS. 9-11). Two-piece rods provide the advantage of reduced length for carrying and permits for repair of either piece without replacing the entire rod. Fishing rod 91 includes a pair of rod portions 93, 95 each having a pair of opposite end sections 37, 97 and 39, 99, a generally tubular receptacle 101, enlargement body 75, and hardenable adhesive material 79 (FIG. 10). To practice this alternative assembling method, hardenable adhesive material 79 is hardened in place between tubular receptacle 101 and opposite end section 99 of rod portion 95 inserted into the tubular receptacle, and opposite end section 97 of rod portion 93 is secured in bore 77 of enlargement body 75 adjacent opposite end 41 thereof by also hardening the hardenable adhesive material 79 in place between bore 77 and opposite end section 97 of rod portion 93 (FIG. 10). Tubular receptacle 101 is inserted into bore 77 of enlargement body 75 adjacent opposite end 43 thereof, and the tubular body is retained against displacement from the bore of the enlargement body (FIGS. 10 and 11).

Alternative fishing rod 91 and the alternative method of assembling such utilize generally the same component parts assembled together and functioning generally in the same manner as those of the previously discussed fishing rods and methods of assembling such with the exceptions noted in the following discussion, and while the alternative fishing rod 91 and method of assembling such meet at least some of the objects set out hereinbefore, it is believed that alternative fishing rod 91 and the method of assembling is also have indigenous objects and advantageous features as will be in part apparent and in part pointed out in the following discussion.

More particularly and with specific reference to FIGS. 9-11, it is contemplated that rod member 73 may be severed generally at intermediate section 35 thereof thereby to provide rod portions 93, 95. Thus, rod portion 93 includes grip end section 37 and opposite end section 97, and rod portion 95 includes tip end section 39 and opposite end section 99; however, opposite end section 97, 99 of rod portions 93, 95 are arranged generally in opposed relation with each other, as discussed in greater detail hereinafter.

To commence the assembling of fishing rod 91, hardenable adhesive material 79 is coated onto at least one of bore 77 adjacent opposite end 41 of enlargement body 75 and opposite end section 97 of rod portion 93, and upon the insertion of rod portion opposite end 97 into bore 77 adjacent opposite end 41 of enlargement body 75, the hardenable adhesive material is hardened in place therebetween so as to secure together rod portion 93 and enlargement body 75. Either before, after or generally simultaneously with the securement of end portion 93 and enlargement body 75, hardenable adhesive material 79 may also be coated onto at least one of a recess or bore 103 is tubular receptacle 101 and opposite end section 99 of rod portion 95, and upon the insertion of rod portion opposite end section 99 into tubular receptacle bore 103, the hardenable adhesive material is hardened in place therebetween so as to secure together rod portion 95 and tubular receptacle 101. While tubular receptacle 101 is illustrated herein as having an end wall 105 against which opposite end section 99 of rod portion 95 may be seated, it is contemplated that the end wall may be omitted from the receptacle within the scope of the invention so as to meet at least some of the objects thereof.

Upon the above discussed securement of rod portion 95 and receptacle 101, the receptacle may be inserted into bore 77 of enlargement body 75 adjacent opposite end 43 thereof. Receptacle 101 has a generally annular end flange 104 extending radially outwardly therefrom which seats against opposite end 43 of enlargement body 75 when the receptacle is inserted into bore 77 thereof. It should be noted that a key 109 is provided in receptacle 101 extending from end flange 104 thereof and that a keyway 111 is provided in enlargement body 75 intersecting with opposite end 43 and bore 77 thereof. Thus, when receptacle 101 is inserted into bore 77 of enlargement body 75, key 109 on the receptacle is received in keyway 111 of the enlargement body, and it also may be noted that the engagement between the key and the keyway obviates relative rotation between the enlargement body and the receptacle. Note that in FIG. 11 the retainer or sleeve 55 and foregrip 27 are not shown.

Either before, after or generally simultaneously with the above discussed disposition of receptacle 101 in bore 77 of enlargement body 75, foregrip 27 may be associated in its assembled position on the enlargement body thereby to dispose conic inner circumferential surface 29 of the foregrip 27 in the wedging engagement thereof with conic outer circumferential surface 45 of the enlargement body generally in the same manner as discussed in detail hereinbefore. Thereafter, threaded retainer 55 may be threadably engaged with the threaded portion 81 on enlargement body 75 and also abutted against opposite end 51 of the foregrip thereby to releaseably retain the foregrip in its assembly position, as previously discussed; however, it may also be noted that the threaded retainer 55 is integrally provided with a generally annular end flange or flange means 113 which extend circumferentially about rod portion 95 for abutting or retaining engagement with end flange 104 on receptacle 101, thereby also to releaseably retain the receptacle against axial displacement from its assembled position or preselected assembled position in bore 77 of the enlargement body. Albeit not shown for purposes of drawing simplification and brevity of disclosure, it is contemplated that threaded portion 83 may be provided on enlargement body 75 with drive member being threadedably operable thereon in the manner previously discussed in detail. To complete the description of the assembly method for fishing rod 91, it is contemplated that an existing rod member 73 may be severed into rod portions 93, 95, as discussed above; however, it is also contemplated that the component parts of fishing rod 91 may be of original manufacture and assembled together as discussed above.

From the foregoing, it is apparent that novel and improved fishing rods 21, 71, 91 along with novel and improved methods of assembling such have been presented meeting the objects set out hereinbefore, as well as others, and it is contemplated that various changes as to the precise arrangements, configurations and connections of the components employed in such fishing rods and methods, as well as the precise order of the steps of such methods, may be made by those having ordinary skill in the art without departing from the spirit of the invention or from the scope thereof as set out in the claims which follow.

What is claimed is:

1. A method of assembling a foregrip to a fishing rod with the fishing rod being cut to create a pair of rod portions each having a pair of opposite end sections, a generally tubular receptacle, an enlargement body having a pair of opposite end portions with a bore interposed therebetween, and a hardenable adhesive material, the method comprising the steps of:

hardening the hardenable adhesive material in place between the tubular receptacle and one of the opposite end sections of one of the rod portions inserted into the tubular receptacle;

securing one of the opposite end sections of the other of the rod portions in the bore of the enlargement body adjacent one of the opposite end portions thereof by hardening the hardenable adhesive material in place between the bore and the one opposite end of the other rod portion;

inserting the tubular receptacle into the bore of the enlargement member adjacent the other of the opposite end portions thereof;

releasable retaining the tubular receptacle against displacement with respect to the bore of the enlargement body; and providing a foregrip having a pair of generally opposite ends with a generally conic inner circumferential surface interposed therebetween, and a generally conic outer circumferential surface on the enlargement body and wherein the method comprises the intermediate step of associating the conic inner circumferential surface of the foregrip about the one rod portion and moving the conic inner circumferential surface of the foregrip at least in part into wedging engagement with at least a part of the conic outer circumferential surface of the enlargement body.

2. The method as set forth in claim 1 wherein the enlargement body includes a keyway intersecting with the one opposite end portion thereof and the bore, and the tubular receptacle including a key thereon and wherein the inserting step includes passing the key on the tubular receptacle into the keyway in the enlargement body and locking thereby the enlargement body and the tubular receptacle against relative rotation.

3. The method as set forth in claim 1 wherein the releasably retaining step includes urging the foregrip against the displacement of the conic inner circumferential surface thereof from its wedging engagement with the conic outer circumferential surface of the enlargement body.

4. The method as set forth in claim 1 wherein the associating and moving step includes obviating circumferential displacement of the foregrip about the enlargement member in response to the wedging engagement between the conic inner circumferential surface of the foregrip and the conic outer circumferential surface of the enlargement body.

5. The method as set forth in claim 1 wherein the conic inner circumferential surface of the foregrip and the conic outer circumferential surface of the enlargement body include a pair of sets of means for engagement with each other and wherein the associating and moving step includes interlocking the engagement means and at least assisting thereby the wedging engagement between the conic inner circumferential surface of the foregrip and the conic outer circumferential surface of the enlargement body in retaining the foregrip against circumferential displacement about the enlargement body.

6. A fishing rod comprising:

a generally elongate rod member;

a generally conic enlargement on said rod member;

a foregrip releasable retained in an assembled position in wedging engagement with said generally conic enlargement on said rod member against movement relative to said rod member, and said foregrip including an outer circumferential surface with at least a part thereof extending substantially the length of said foregrip and being eccentric with respect to said rod member and adjustably disposed in a preselected angular position generally circumferentially about said rod member part so as to extend generally radially therefrom when the foregrip is in its assembled position; and means mounted on the rod and associated with the forward end of said foregrip for releasably retaining said foregrip against movement from the assembled position.

7. The fishing rod as set forth in claim 6 wherein said conic enlargement is separate from said rod member and comprises a generally elongate body including a generally conic outer circumferential surface associated in the wedging engagement with said foregrip in its assembled position, and an inner circumferential surface received about said rod member, and a hardenable adhesive material hardened in place between said inner circumferential surface and said rod member thereby to adhere together said body and said rod member.

8. The fishing rod as set forth in claim 7 wherein said body further includes a threaded portion extending beyond said foregrip in its assembled position, and threaded means threadably engaged with said threaded portion and abutted against said foregrip for releasably retaining said foregrip in the assembled position thereof.

9. The fishing rod as set forth in claim 7 wherein said body further includes a threaded portion extending beyond said foregrip in its assembled position, and means threadably engaged with said threaded portion and operable generally for driving said foregrip from the assembled position.

10. The fishing rod as set forth in claim 6 wherein said conic enlargement and said foregrip include a pair of sets of means for engagement with each other to at least assist the wedging engagement between said conic enlargement and said foregrip in retaining said foregrip against circumferential movement about said conic enlargement when said foregrip is in its assembled position.

11. The fishing rod as set forth in claim 6 wherein said part on said rod member includes a threaded portion extending beyond said foregrip when said foregrip is in its assembled position, and means associated in threaded engagement with said threaded portion and abutted against said foregrip for releasably retaining said foregrip against movement from the assembled position.

12. The fishing rod as set forth in claim 6 wherein said part on said rod member includes a threaded portion extending beyond said foregrip in its assembled position, and means threadably engaged with said threaded portion and operable generally for driving said foregrip from the assembled position.

13. A foregrip adapted for releasable securement to a fishing rod, the foregrip comprising:

a body having a pair of generally opposite end portions;

a generally conic inner circumferential surface within said body and interposed between said opposite end portions thereof;

an outer circumferential surface on said body interposed between said opposite end portions thereof and with at least a part of said outer circumferential surface being eccentrically arranged with said conic inner circumferential surface and extending substantially the length of said foregrip;

an inner member having a generally conic outer surface for mating with said inner surface of said body, said inner member being adapted for fixed attachment to a fishing rod; and means mounted on the inner member abutting at least one end of said body for releasably securing said body to said inner member.

14. A fishing rod comprising:

a generally elongate sleeve having a pair of generally opposite end portions, a generally conic outer circumferential surface on said sleeve and extending at least in part between said opposite end portions thereof, a bore extending generally axially through said sleeve between said opposite end portions thereof, and a keyway in said sleeve intersecting with one of said opposite end portions thereof and said bore;

a generally tubular receptacle received in said bore adjacent said one of said opposite end portions of said sleeve and including a key received in said keyway thereby to obviate rotation of said tubular receptacle in said bore;

a pair of generally elongate rod portions each having a pair of opposite end sections, one of said opposite end sections of one of said rod portions being received within said tubular receptacle and one of said opposite end sections of the other of said rod portions being received within said bore adjacent the other of said opposite end portions of said sleeve;

a hardenable adhesive material hardened in place between said tubular receptacle and said one opposite end section of said other rod portion;

a foregrip movable between an assembled position and a displaced position, said foregrip including a pair of generally opposite ends, and a generally conic inner circumferential surface extending at least in part between said opposite ends and interlocked in wedging engagement with said conic outer circumferential surface of said sleeve when said foregrip is in the assembled position thereof;

and means mounted on said sleeve abutting the forward end of said foregrip for releasably retaining said foregrip against movement from the assembled position toward the displaced position thereof.

15. The fishing rod as set forth in claim 14 wherein said sleeve includes a threaded portion about said one end portion adjacent the forward end of said foregrip and extending beyond one of said opposite ends of said foregrip when said foregrip is in its assembled position, and means associated in threaded engagement with said threaded portion and abutted against said one opposite end of said foregrip for releasably retaining said foregrip against movement from the assembled position toward the displaced position thereof.

16. The fishing rod as set forth in claim 14 wherein said conic inner circumferential surface of said foregrip and said conic outer circumferential surface of said sleeve include a pair of sets of means for engagement with each other to at least assist the wedging engagement between said conic inner and outer circumferential surfaces in retaining said foregrip against circumferential movement about said sleeve when said foregrip is in its assembled position.

17. The fishing rod as set forth in claim 14 wherein said foregrip further includes an outer circumferential surface interposed between said opposite ends thereof and arranged at least in part generally eccentrically with respect to said conic inner circumferential surface so that said at least part of said outer circumferential surface extends in a preselected angular position circumferentially about said sleeve when said foregrip is in its assembled position.

* * * * *